United States Patent
Reese

[15] 3,701,362
[45] Oct. 31, 1972

[54] POSITION INDICATING BUTTERFLY VALVE
[72] Inventor: Anthony L. Reese, Bradford, Pa.
[73] Assignee: Dresser Industries, Inc., Dallas, Tex.
[22] Filed: July 12, 1971
[21] Appl. No.: 161,805

[52] U.S. Cl. .................137/556.3, 137/68, 137/797, 251/308
[51] Int. Cl. .......F16k 37/00, F16k 17/14, F16k 1/22
[58] Field of Search .....137/68, 556.3, 797; 251/306, 251/307, 308

[56] References Cited
UNITED STATES PATENTS 2,843,152  7/1958  Laird et al. .................137/797
3,452,766  7/1969  Fenster.........................137/68
3,471,121  10/1969  Geiselman..................251/308

Primary Examiner—Henry T. Klinksiek
Attorney—Robert W. Mayer et al.

[57] ABSTRACT

A butterfly valve construction having an outside indicator for indicating vane relation between open and closed positions of the valve. A single assembly mode between the vane, drive shaft and outside indicator assures accurate exterior indication of vane relation. Vane operating force is transmitted through a replaceable shear pin which, in event of operating interference, fractures to prevent damage to other valve components.

8 Claims, 7 Drawing Figures

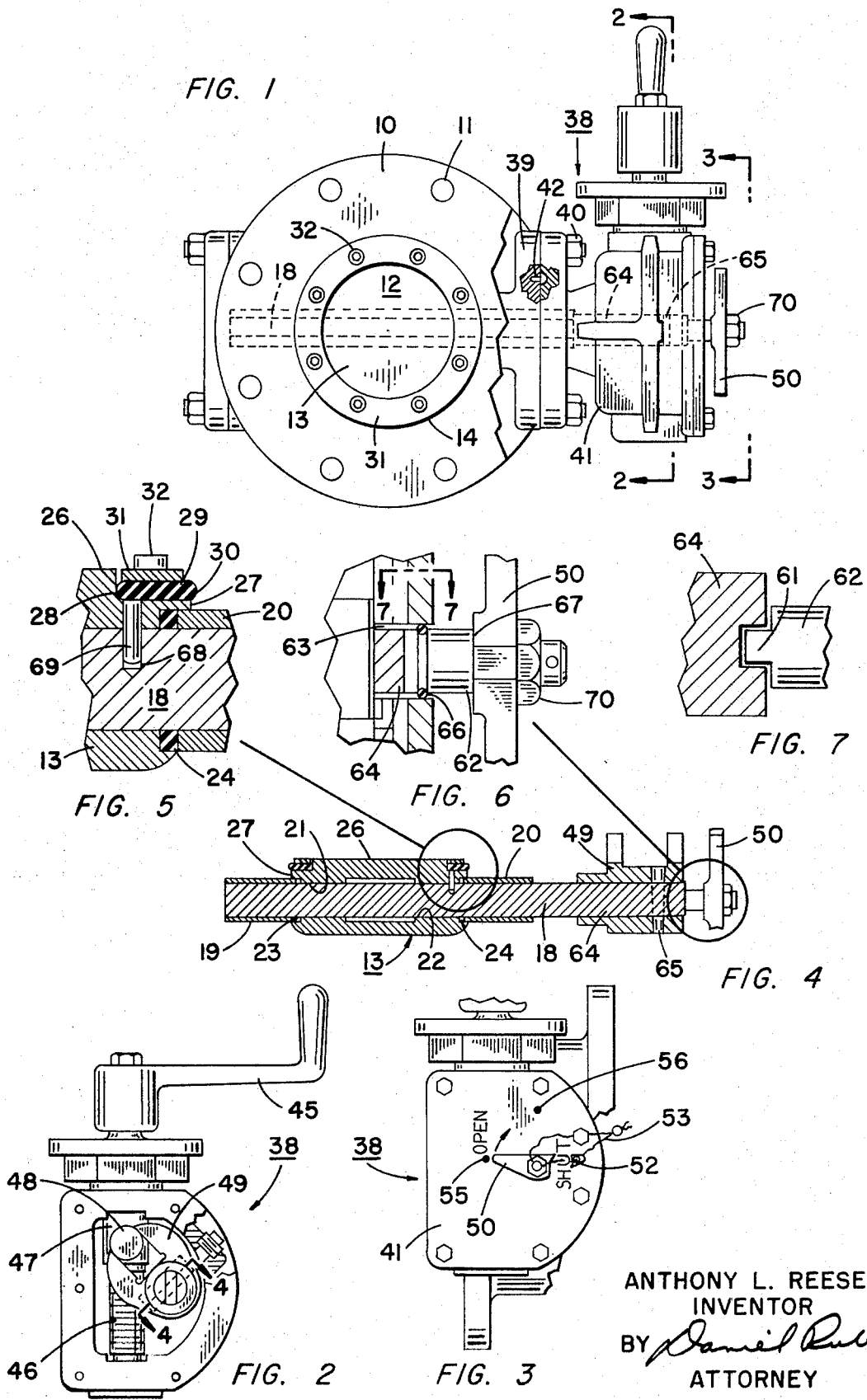

POSITION INDICATING BUTTERFLY VALVE

BACKGROUND OF THE INVENTION

1. The field of art to which the invention pertains includes "Valve and Valve Actuation" as contained in Patent Office class 251.

2. The prior art to which the invention is directed includes the art of butterfly valves being a valve type in which a usually circular vane or disc is rotatable in fluid passage between an open and closed position. When in the closed position, the vane engages a seat with which it cooperates to provide a seal against leakage of pressurized line contents intended to be controlled by the valve. In conventional use, it is customary to open and close a butterfly valve by rotating the valve operator until reasonable resistance to rotation is encountered. If the valve has been properly assembled and all components are in good working order, this procedure is generally regarded as adequate for most purposes. However, should a foreign object lodge in the body as to interfere with vane rotation, the resistance technique, if relied on, will provide a false indication of vane position. Where the error is recognized from audio or visual observation the usual reaction is to exert increased rotational torque against the valve operator until the desired operating condition is obtained. Whereas increasing the turning torque may succeed, it frequently subjects the valve components to physical stresses beyond their design capabilities to the point of failure. The latter of course requires valve disassembly and complex repair. Moreover, any misalignment between assembled components occurring either in original manufacture or from reassembly after repair, can cause the valve to be similarly subject to adverse operating effects.

In recognition of the foregoing certain applications of use, such as the fire protection market, regard knowledge of the vane relation as critical for obvious reasons. At the same time, it is also recognized as desirable to confine stresses from over torque to a single readily replaceable component whereby damage to operating components is prevented without sacrificing previous torque limiting capabilities. Prior approaches to these problems have encountered costly manufacturing techniques and/or unreliable quality control not to mention incurred line content leakage resulting from the special adaptations employed for that purpose. As a result of less than satisfactory construction, these prior valves have entailed unwanted testing expense to ensure operating performance for marketing dependability.

SUMMARY

This invention relates to butterfly valves and more particularly to an improved construction for position indication thereof. In accordance herewith, a novel and comparatively inexpensive form of single mode assembly is utilized for interconnection between the vane, drive shaft and outside indicator. This renders component interassembly fool-proof even on reassembly following repair as to ensure accurate indication of vane position throughout life expectancy of the valve without need of individual post-assembly leak testing. By use of a shear pin discretely situated connecting the valve operator to the vane shaft, overtorque to the operating components is prevented without sacrifice in otherwise available operating performance.

It is therefore an object of the invention to provide a novel construction for an indicating butterfly valve.

It is a further object of the invention to provide a novel, comparatively inexpensive form of single mode interassembly of valve components for an indicating butterfly valve whereby to ensure fool-proof assembly in obtaining correctly corresponding exterior indications of vane operating position.

It is a further object of the invention to provide a novel construction for an indicating butterfly valve to discretely limit operating input torque below the level at which damage to valve components could otherwise occur.

It is a still further object of the invention to provide an indicating butterfly valve as in the aforementioned objects that is comparatively inexpensive to manufacture while affording these valves a reliable level of quality control without the necessity of post assembly testing in the manner of the prior art.

BRIEF DESCRIPTION OF THE DRAWINGS

FIG. 1 is a plan, partially sectioned view of a butterfly valve incorporating the construction of the invention hereof;

FIG. 2 is an end elevation through the operator assembly with the end cover removed and partially in section;

FIG. 3 is a fragmentary end elevation of the outside indicator mechanism;

FIG. 4 is a longitudinal section as viewed substantially along the lines 4—4 of FIG. 2;

FIG. 5 is a fragmentary sectional enlargement of the encircled portion 5 of FIG. 4;

FIG. 6 is a fragmentary sectional enlargement of the encircled portion 6 of FIG. 4; and FIG. 7 is a fragmentary section as viewed substantially along the lines 7—7 of FIG. 6.

Referring now to the drawings there is disclosed a butterfly valve of a commercially available type, as for example disclosed in patent U. S. Pat. No. 3,420,500 which is incorporated herein by reference. Briefly, the valve is comprised of a body or housing 10 having bolt holes 11 for attachment to a piping system with which the valve is to be used. Extending centrally longitudinal through the body is a fluid passage 12 in which is contained a circular turning vane 13 which cooperates with an annular seat 14 for effecting valve shutoff when required. Supporting vane 13 for rotational movement is a transversely extending non-circular, preferably hexagonal cross shaft 18 in turn rotatably supported in housing journals 19 and 20. For effecting a driving interlock between the vane and shaft the former includes complementary non-circular bores 21 and 22 in which the latter is received. Sealing of the shaft against line content exposure is by virtue of vane 13 in combination with annular seals 23 and 24.

The vane includes a face 26 having a generally circular periphery 27 and an annular notched recess 28 about its peripheral corner in which is secured a rubber or other suitable type resilient gasket 29. Gasket 29 has an outer rounded or bevelled edge 30 for cooperating with annular seat 14. Adjustment of edge 30 for proper seating is via an annular clamp ring 31 bonded thereto and secured to the vane by means of cap screws 32.

Drive for operating vane 13 between open and closed position is effected by an attached operator designated 38. The operator is mounted on body base plate 39 by means of bolts 40 while interfitting cross pin 42 ensures matched alignment therebetween. Comprising operator 38 is a housing 41 in which shaft 18 is received extending inwardly through the match aligned base plates. To open and close the valve there is provided a crank handle 45 secured to a rotatable lead screw 46 threadably supporting a threaded crosshead follower 47. A stud 48 laterally extending outward of the follower engages a transverse bifurcated yoke 49 secured to shaft 18 by a tapered shear pin 65 as will be further described. In this manner, longitudinal movement of follower 47 by action of crank 45 effects rotational displacement of the vane between its open and closed position. The exact vane position whether at either extreme or somewhere intermediate thereof is visually apparent from exterior of the valve by means of a position indicator 50. As best shown in FIG. 3, indicator 50 is triangular and moves in conjunction with the vane through a 90° arcuate path relative to the exterior wall face of operator housing 41. The extremes are represented by "open" and "shut" positions designated 55 and 56 respectively and as illustrated the valve is shown in its open position. An aperture 52 accommodates a seal wire 53 for position locking by the customer.

In order to ensure accurate correspondence between the vane position and indicator 50 relative to positions 55 and 56, they are rotationally interlocked in a one mode assembly orientation. This includes a transverse slot 60 in the end of circular shaft portion 64 to receive a transverse complementary nose piece 61 extending laterally integral from the leftward end (as illustrated FIG. 7) of an indicator pin 62. In turn pin 62 is rotationally supported in housing aperture 63 via an annular seal 66 and at its opposite end is shouldered at 67 against which to receive the inward face of indicator 50. A nut 70 threadably secures indicator 50 keyed onto pin 62.

Rotatable connection of yoke 49 to shaft end 64 is by means of a tapered shear pin 65 (FIG. 5) extending through the matched tapered bores in the yoke and shaft provided for that purpose. Finally, drive between hex shaft 18 and vane 13 is likewise one mode oriented being effected by the hexagonal interfit therebetween but requiring matched orientation for purposes of assembly. The latter matching is governed by axially aligned matched radial ports or slots 68 extending through from the radial surface of gasket recess 28 for limited radial penetration inward of shaft end 64. Interconnecting the vane and shaft supported coextending in slots 68 is a hardened steel pin 69 which when in place prevents assembly in other than the intended orientation. Most important also in this relationship is that slot 68 extends from the underside of gasket 29 enabling its opening to be completely sealed against line content leakage. In this arrangement therefore, the gasket positively prevents line content leakage through port 68 to shaft 18 otherwise completely sealed therefrom.

Since the interfit alignment just described has a one mode assembly orientation between the vane and shaft, the indicator and shaft, and the shaft to yoke a single assembly mode is similarly afforded these components as a unit for their interconnection. Any attempt to effect assembly otherwise than that intended is positively precluded as to render the assembly completely foolproof even in the event of subsequent disassembly for reasons of repair or the like. With the interconnection afforded by pin 69 being itself completely sealed against line content, the possibility of leakage occurring by reason of that connection is likewise positively precluded. As a consequence thereof, quality control is assured rendering subsequent tests unnecessary in the manner of the prior art to ascertain leak possibilities prior to marketing of the valve.

Shear pin 65 provides the interconnection between follower 49 and shaft 18 in a manner generally retaining integrity of the shaft whereby rotational torque of customary magnitude is transmitted to vane 13 in a conventional manner. Should, however, a foreign object or the like become lodged in passage 12 as to interfere with vane movement in either direction, excessive rotational torque if applied will cause pin 65 to shear and effectively disconnect the drive shaft from yoke 49 before damage to other components is incurred. In one embodiment for 6 inch service, 200 ft.-lbs. is normally required for operating the valve under service conditions. The operating components, usually of hardened steel, are subject to failure beginning at about 700 ft.-lbs. Pin 65, by comparison, is usually of brass and is designed for shear failure at about 500 ft.-lbs.

By the above description there is disclosed novel construction for a butterfly valve adapted to provice accurate exterior indication of the vane relation between its open and shut positions. By means of a single assembly mode employing orientation interfits between the various components misassembly is positively precluded even on reassembly following service or repair. Not only are the interfits provided but they are achieved in a highly economical manner whereby they themselves cannot become a cause of line content leakage into or past the vane to shaft 18 intended to be isolated therefrom. The valve otherwise continues operable in the previous manner yet should excessive stresses be encountered during valve operation by virtue of interference imposed against the vane, tapered shear pin 65 will self destruct at torque values below which damage to other components would occur. This tamper proof, fool-proof arrangement of components therefore fulfills a long felt need to provide accurate vane indication in valves of this type yet affords the shear pin overload safety feature for applications of use wherein such indication and/or overload features are required.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a butterfly valve including a housing defining a fluid passage between an inlet and an outlet, a vane member interposed in said passage and rotatable between positions to open and close said passage to fluid flow, a gasket secured to said vane for effecting passage sealing when said vane is in said close position, an operator for rotatably operating said vane between said positions, a shaft operably connecting said operator to said vane, and an indicator exterior of said housing for registering vane position within said passage, the improvement comprising:
  a. a first one mode relatively oriented interconnection between said shaft and said operator;
  b. a second one mode relatively oriented interconnection between said shaft and said indicator; and
  c. a third one mode relatively oriented interconnection between said vane and said shaft including interlocking means located extending inward of said vane in a sealed relation from the underside of the said gasket.

2. In a butterfly valve according to claim 1 in which said first interconnection includes a tapered shear pin having shear properties affording failure at operator imposed torque below tolerable stress levels of connected components through which said torque is transmitted.

3. In a butterfly valve according to claim 2 in which the failure level of said shear pin is about 60 percent intermediate the normal operating level and the failure level of said connected components.

4. In a butterfly valve according to claim 3 in which said shear pin is of a metal different than said connected components.

5. In a butterfly valve according to claim 4 in which said shear pin is brass and said connected components are generally of a steel composition.

6. In a butterfly valve according to claim 1 in which said second interconnection includes a rotational interlock between said shaft and said indicator at the shaft end opposite said vane and outward of said operator.

7. In a butterfly valve according to claim 1 in which said interlocking means comprises a pin extending radially of said shaft into oppositely aligned apertures of said shaft and said vane.

8. In a butterfly valve according to claim 7 in which said gasket is annular and radially superposed to a radially extending annular surface on said vane and said pin extends in the vane generally parallel to the vane axis from about said annular surface to into said shaft.

* * * * *